(12) United States Patent
Walker et al.

(10) Patent No.: US 10,612,713 B2
(45) Date of Patent: Apr. 7, 2020

(54) FIBER COMPOSITE SYSTEM AND METHOD FOR PIPE REINFORCEMENT

(71) Applicant: Cowboy Acquisition, LLC, Houston, TX (US)

(72) Inventors: Roger Walker, Tulsa, OK (US); Timothy Scott Mally, Tulsa, OK (US); R. Eric Locke, Tulsa, OK (US); Mahdi Kiani, Tulsa, OK (US)

(73) Assignee: COWBOY ACQUISITION, LLC, Houston, TX (US)

( * ) Notice: Subject to any disclaimer, the term of this patent is extended or adjusted under 35 U.S.C. 154(b) by 192 days.

(21) Appl. No.: 15/920,760

(22) Filed: Mar. 14, 2018

(65) Prior Publication Data

US 2018/0266613 A1 Sep. 20, 2018

Related U.S. Application Data

(60) Provisional application No. 62/471,232, filed on Mar. 14, 2017.

(51) Int. Cl.
| | |
|---|---|
| *F16L 55/16* | (2006.01) |
| *F16L 55/168* | (2006.01) |
| *F16L 55/175* | (2006.01) |
| *F16L 9/02* | (2006.01) |

(52) U.S. Cl.
CPC ......... *F16L 55/1686* (2013.01); *F16L 55/175* (2013.01); *F16L 9/02* (2013.01)

(58) Field of Classification Search
CPC . F16L 55/1686; F16L 55/1683; F16L 55/175; F16L 58/1063; B29C 63/10; B29C 63/0021; B29C 63/06; B29C 73/10

USPC .......... 138/99, 97, 172; 428/298.1; 156/188, 156/178

See application file for complete search history.

(56) References Cited

U.S. PATENT DOCUMENTS

| | | | | |
|---|---|---|---|---|
| 4,756,337 | A * | 7/1988 | Settineri | B29C 65/5042 138/99 |
| 6,336,983 | B1 * | 1/2002 | Fawley | B29C 63/14 138/99 |
| 7,174,920 | B2 * | 2/2007 | Stubler | F16L 55/18 138/105 |
| 2006/0272724 | A1 * | 12/2006 | Borland | F16L 55/1686 138/99 |
| 2011/0079311 | A1 * | 4/2011 | Lazzara | B29C 63/10 138/99 |

(Continued)

*Primary Examiner* — Patrick F Brinson
(74) *Attorney, Agent, or Firm* — Duane Morris LLP

(57) ABSTRACT

A reinforced pipe and a method of preparing the reinforced pipe are provided. The reinforced pipe has repair area where a wrinkle bend is present in a center section of the repair area. The reinforced pipe comprises a unidirectional fabric circumferentially wrapped around the repair area of the pipe so as to result in multiple layers of the unidirectional fabric around the repair area. The unidirectional fabric is composed of high-performance fibers with at least 90% of the high-performance fibers oriented in the 90° direction, and the unidirectional fabric is wrapped such that the high-performance fibers run in the axial direction. The reinforced pipe further comprises a bidirectional fabric wrapped of over the unidirectional fabric such the at least one layer of bidirectional fabric is wrapped over the unidirectional fabric.

22 Claims, 8 Drawing Sheets

(56) References Cited

U.S. PATENT DOCUMENTS

| | | | |
|---|---|---|---|
| 2013/0157060 A1* | 6/2013 | Komori | C08L 75/02 |
| | | | 428/414 |
| 2015/0204476 A1* | 7/2015 | Lazzara | F16L 9/042 |
| | | | 138/99 |
| 2015/0321448 A1* | 11/2015 | Lazzara | F16L 9/042 |
| | | | 156/94 |
| 2016/0214336 A1* | 7/2016 | Lazzara | B29C 73/10 |
| 2016/0214781 A1* | 7/2016 | Lazzara | B29C 73/10 |

* cited by examiner

FIBER COMPOSITE SYSTEM AND METHOD FOR PIPE REINFORCEMENT

RELATED APPLICATIONS

This application claims priority to U.S. provisional application Ser. No. 62/471,232, filed Mar. 14, 2017, which is incorporated by reference herein in its entirety.

FIELD

The present disclosure relates generally to pipe reinforcement and repairs, and more specifically, to reinforcing or repairing pipes by using composite fiber materials.

BACKGROUND

Defects in steel pipes utilized in pipelines can result in fatigue and failure of the pipe when the pipe undergoes stress such as can occur during the transportation of hydrocarbon compounds, such as oil and natural gas. For a steel pipe with corrosion, dents, gouges and/or cracks, the primary stress in the pipe is exerted in the hoop direction. Therefore, common composite reinforcement or repair systems have been directed to reducing these hoop stresses on the pipe thus preventing fatigue and failure. However, in a wrinkle bend, the most common failure occurs due to high amounts of strain in the axial direction of the pipe. Traditional composite reinforcement systems have not been able to adequately reinforce the pipes at wrinkle bends when installed using traditional application techniques.

Wrinkle bends are introduced in a pipe during construction; typically, they are introduced during alignment of the pipe by bending. Bending practices used during pipeline construction often resulted in circumferential pipe deformation or wrinkles on the inside bend radius of the pipe. Vintage wrinkle bends are often of the wave shape with outward deformations. Additionally, "mild ripples" are those developed using modern day field-bending techniques where such ripples bear a length to height ratio on the order of 12. Whereas the wrinkle bends found typically on vintage built pipelines are sharper than these ripples with length to height ratio on the order of 4.

SUMMARY

In accordance with one series of embodiments of the current disclosure, there is provided a reinforced pipe having an axial direction and a circumferential direction with a wrinkle bend oriented in the circumferential direction. The pipe comprises a repair area having a left section, a right section and a center section such that the center section is between the left section and the right section. The center section contains the wrinkle bend.

The pipe further comprises a unidirectional fabric (specifically woven to provide all or most of the yarn in the weft direction) circumferentially wrapped around the repair area of the pipe so as to result in multiple layers of the unidirectional fabric around the repair area. The unidirectional fabric has a length, a width, a 0° direction corresponding to the length and a 90° direction corresponding to the width. The unidirectional fabric is composed of high-performance fibers with at least 90% of the high-performance fibers oriented in the 90° direction, and the unidirectional fabric is wrapped such that the high-performance fibers run in the axial direction.

The pipe also comprises a bidirectional fabric wrapped over the unidirectional fabric such that at least one layer of bidirectional fabric is wrapped over the unidirectional fabric. The layers of unidirectional fabric and layers of bidirectional fabric make up the total layers of fabric around the repair areas. The unidirectional fabric makes up at least 70% of the total layers of fabric at the center section. The unidirectional fabric and bidirectional fabric can be wrapped wet with epoxy resin.

In some embodiments, the unidirectional fabric can make up at least 60% of the total layers of fabric at the left edge section and make up at least 60% of the total layers of fabric at the right edge section. The bidirectional fabric can make up at least 20% of the total layers of fabric at the left edge section and make up at least 20% of the total layers of fabric at the right edge section. In some of these embodiments, the unidirectional fabric can make up at least 75% of the total layers of fabric at the center section. The unidirectional fabric can make up at least 65% of the total layers of fabric at the left edge section and make up at least 65% of the total layers of fabric at the right edge section. The bidirectional fabric can make up at least 30% of the total layers of fabric at the left edge section and make up at least 30% of the total layers of fabric at the right edge section. Further, the unidirectional fabric can make up at least 80% of the total layers of fabric at the center section.

In some embodiments, the unidirectional fabric is wrapped around the repair area in multiple strips and each strip is of sufficient length such that each strip provides at least one layer, and many times two layers when wrapped circumferentially around the pipe. Additionally, every other strip of the unidirectional fabric is offset from the preceding layer by from 40% to 60% of the width of the unidirectional fabric. In some cases, the offset can be about 50% of the width of the unidirectional fabric. Also, the bidirectional fabric can be wrapped so as to have a similar offset.

In some embodiments, the unidirectional fabric is composed of high-performance fibers and conventional fibers with the high-performance fibers oriented in the 90° direction and the conventional fibers oriented in the 0° direction, and the conventional fibers are stitched to the high-performance fibers thus holding them in the 90° direction. Typically, the high-performance fibers can have a Young's modulus of at least 100 GPa and a tensile strength of at least 1300 MPa based on a fiber diameter of 8 μm to 20 μm. The conventional fibers can have a Young's modulus of less than 50 GPa and a tensile strength of less than 1100 MPa based on a fiber diameter of from 8 μm to 20 μm.

In some embodiments, the bidirectional fabric has a length, a width, a 0° direction corresponding to the length of the bidirectional fabric and a 90° direction corresponding to the width of the bidirectional fabric. The bidirectional fabric can have from 35% to 75% of its fiber running in the 0° direction of the bidirectional fabric and 35% to 75% of its fiber running in the 90° direction of the bidirectional fabric.

In accordance with another series of embodiments of the current disclosure, there is provided a method of reinforcing a pipe in accordance with the above embodiments. The pipe has an axial direction and a circumferential direction with a wrinkle bend oriented in the circumferential direction. The method includes applying a load transfer material in a repair area of the pipe around the wrinkle bend so as to provide a smooth transition. The repair area has a left section, a right section and center section such that the center section is between the left section and right section and contains the wrinkle bend. The method further includes applying a resin over the repair area, and wrapping multiple layers of a unidirectional fabric circumferentially around the repair area. The unidirectional fabric has a length, a width, a 0° direction corresponding to the length and a 90° direction corresponding to the width. The unidirectional fabric is composed of high-performance fibers with 90% of the high-performance fibers oriented in the 90° direction. The unidirectional fabric is wrapped such that the high-performance fibers run in the axial direction. The method also includes wrapping at least one layer of a bidirectional fabric over the unidirectional fabric such that the layers of unidirectional fabric and layers of bidirectional fabric make up the total layers of fabric around the repair area, and wherein the unidirectional fabric makes up at least 70% of the total layers of fabric at the center section.

In some embodiments, the unidirectional fabric is wrapped around the repair area in multiple strips and each strip is of sufficient length such that each strip provides at least two layers when wrapped circumferentially around the pipe. Every other strip of the unidirectional fabric can offset from the preceding layer by from 40% to 60% of the width of the unidirectional fabric or by about 50% of the width of the unidirectional fabric.

In some embodiments, the method further comprises applying the resin to the unidirectional fabric and bidirectional fabric prior to wrapping the unidirectional fabric or bidirectional fabric around the pipe.

DETAILED DESCRIPTION

Figure 1:
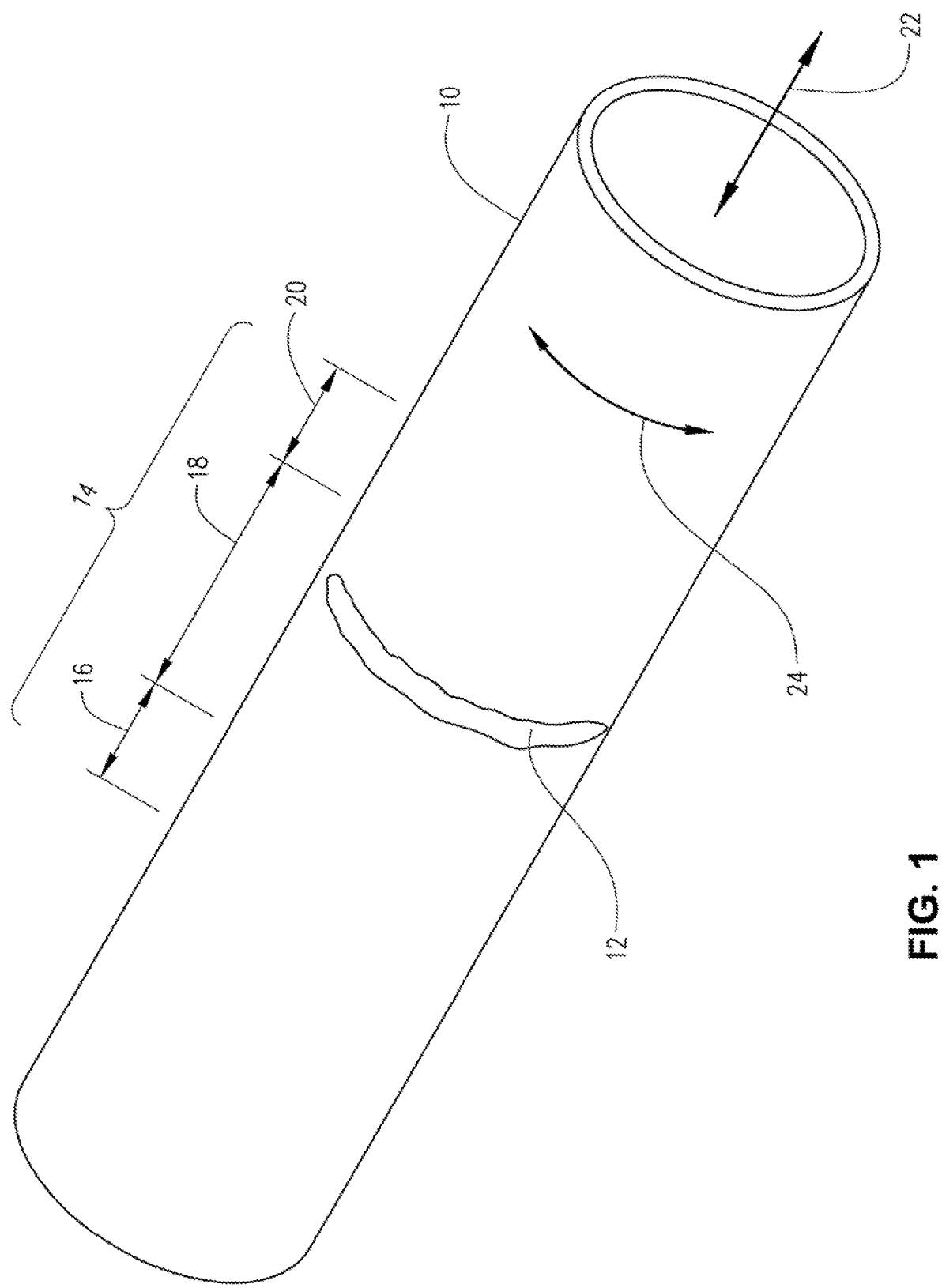
FIG. 1 is a perspective view illustrating a pipe having a wrinkle bend.

In the description that follows, like parts are marked throughout the specification and drawings with the same reference numerals, respectively. The drawings are not necessarily to scale and the proportions of certain parts have been exaggerated to better illustrate details and features of the invention. In the following description, the terms "inwardly" and "outwardly" are directions toward and away from, respectively, the geometric axis of a referenced object. Where components of relatively well-known designs are employed, their structure and operation will not be described in detail.

Referring now to FIG. 1, a pipe 10 is illustrated. Pipe 10 is a pipe having a wrinkle bend 12. Typically, pipe 10 will be a metal pipe, such as steel, aluminum, etc. More typically, pipe 10 is a steel pipe. Wrinkle bend 12 is the type that is introduced in a pipe during construction during alignment of the pipe by bending. Wrinkle bend 12 runs circumferentially along pipe 10. A repair area 14 is defined around wrinkle bend 12. The repair area has a left section 16, a center section 18 and a right section 20. Center section 18 is between left section 16 and right section 20, and center section 18 contains wrinkle bend 12. Pipe 10 has an axial direction (or longitudinal direction) 22 and a circumferential direction 24. As previously indicated, wrinkle bend 12 is oriented in the circumferential direction.

In accordance with this disclosure, there is provided a reinforced pipe wherein the pipe 10 has wrinkle bend 12, and repair area 14 around the wrinkle bend has been reinforced by several distinct layers. The reinforced pipe is described below in relation to FIGS. 2 to 6, which illustrate the distinct layers.

Figure 2:
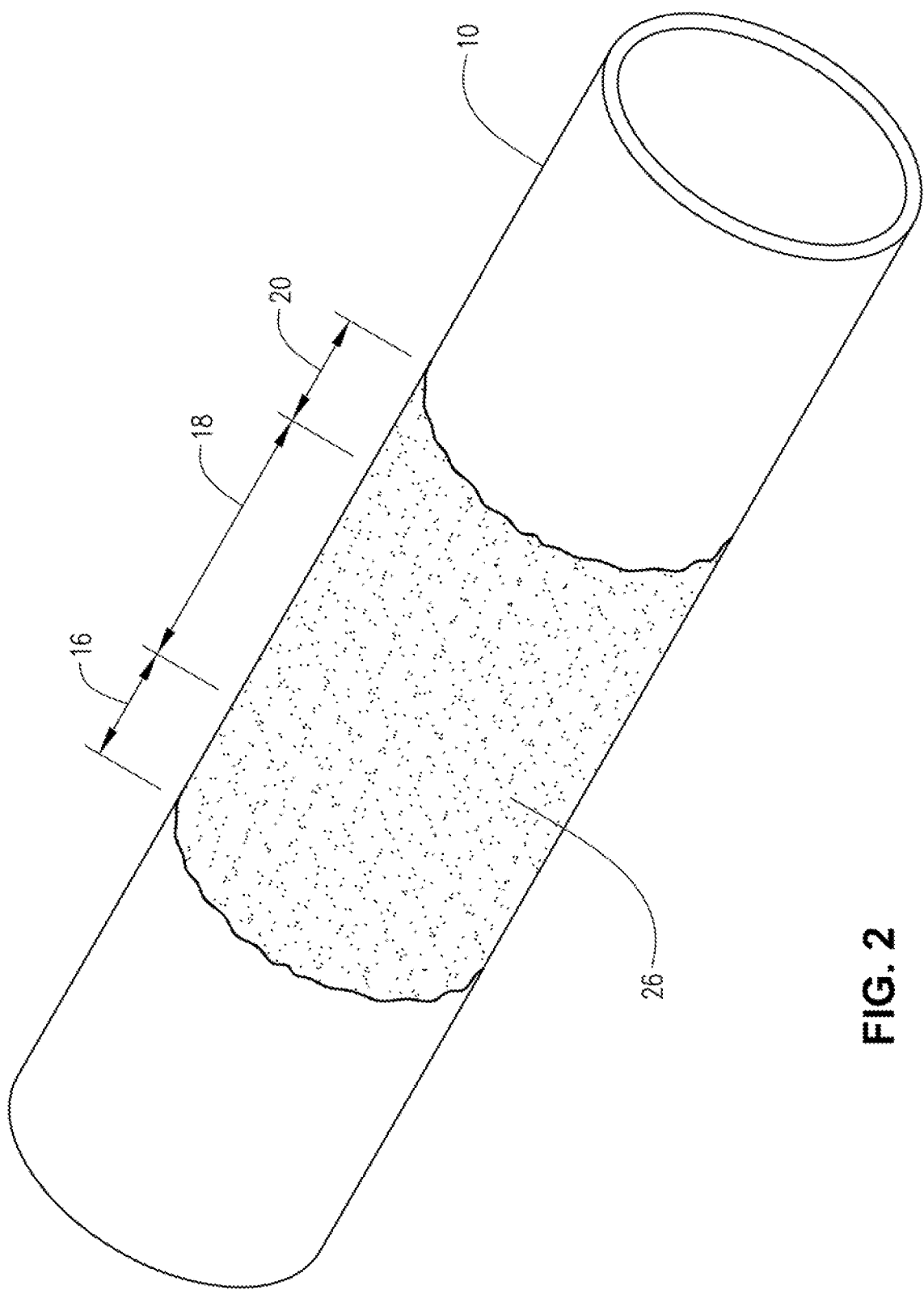
FIG. 2 is a perspective view of the pipe of FIG. 1 with a resin coating on the repair area.

Turning now to FIG. 2, the first layer to be deposited on pipe 10 typically will be a load transfer material 26 to even out the surface of the repair area and fill in any gaps or voids in the surface, such as dents, gouges and/or cracks. The load transfer material typically is tested for compressive strength and modulus, and additionally for compatibility with the composite system being applied to the pipe 10. While generic load transfer materials are often unsuitable for use in this application, the load transfer material generally can be any suitable putty such as epoxy putties designed for making fast and curable repairs to metals, or ceramic load transfer fillers. Load transfer material 26 is applied to center section 18, in the location of the wrinkle bend, and in localized areas within repair section 14 where any other defects may exist.

In some embodiments, a resin is applied on top of load transfer material 26, generally before the load transfer material has cured. In such embodiments, resins are applied in an uncured or partially cured state and at least the unidirectional fabric (see discussion below) is applied prior to the resin curing. The resin can be configured to cure into a rigid or semi-rigid state after the unidirectional fabric is applied. Some non-limiting examples of resins used to adhere adjacent unidirectional fibers and to adhere overlying unidirectional fiber layers include polyurethane, polyurea, epoxy, polyimide, polyoxazolidones, silanes, vinyl ester resins, and/or any one, two, or multicomponent resin systems. In some aspects, the resins include a polyurethane material having an aliphatic prepolymer. In some aspects, the resins can include a polyurethane material having an aliphatic isocyanate prepolymer. In some aspects, the resins can include a polyurethane material having an isocyanate prepolymer. In some aspects, the resins (e.g., one with an aliphatic isocyante prepolymer) include a polyurethane material chemically configured to activate and harden after removal from a generally inert environment and exposure to humid air, moisture-borne air, or an environment that otherwise provided moisture to activate the resin. In some embodiments, the resins include a two-part bisphenol epoxy resin material having a modified aliphatic amine hardener. The resins can also include a two-part novolac epoxy resin material having a modified aliphatic amine hardener.

Figure 3:
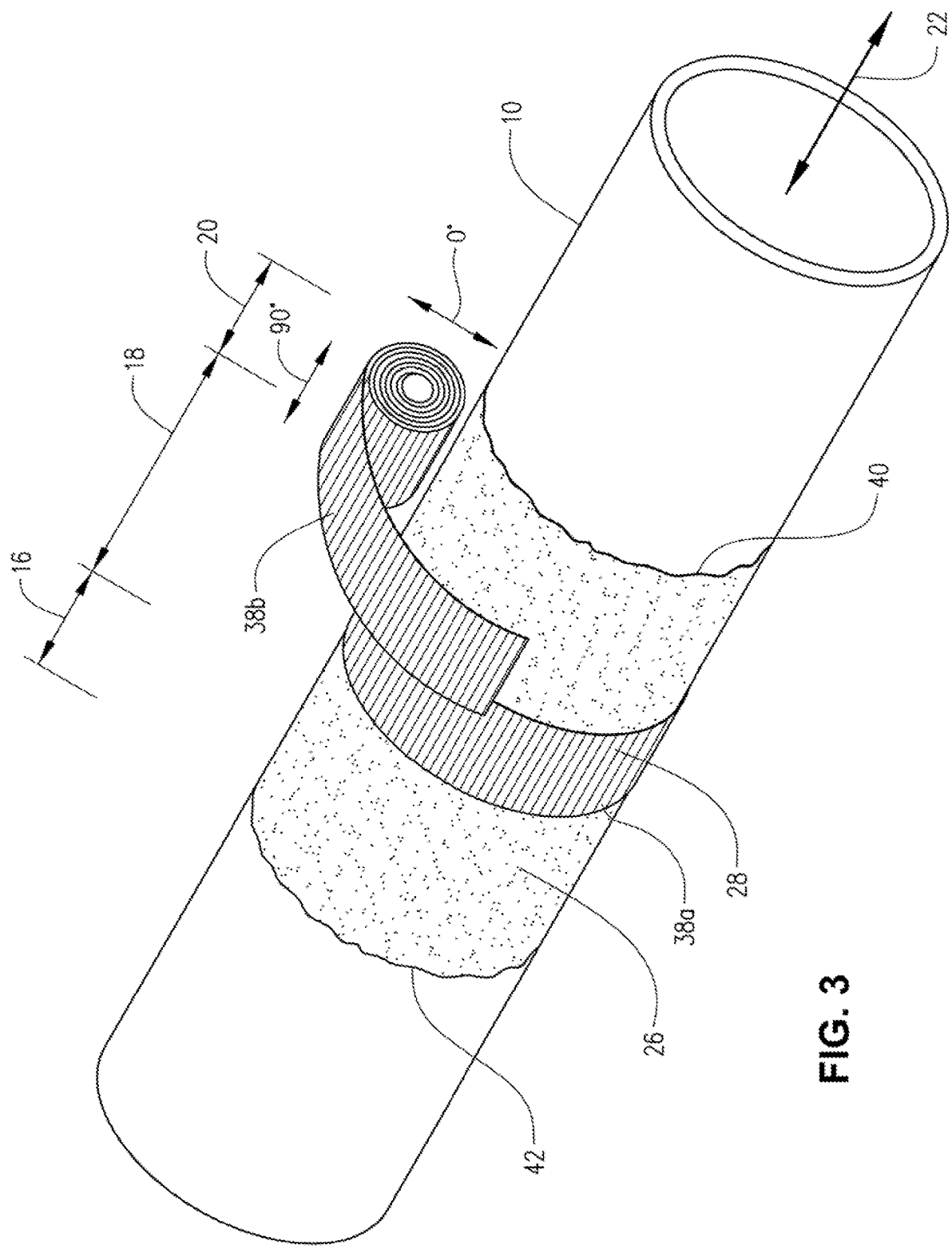
FIG. 3 is a perspective view of the pipe of FIG. 2 illustrating the application of a unidirectional fabric to the repair area.
Figure 4:
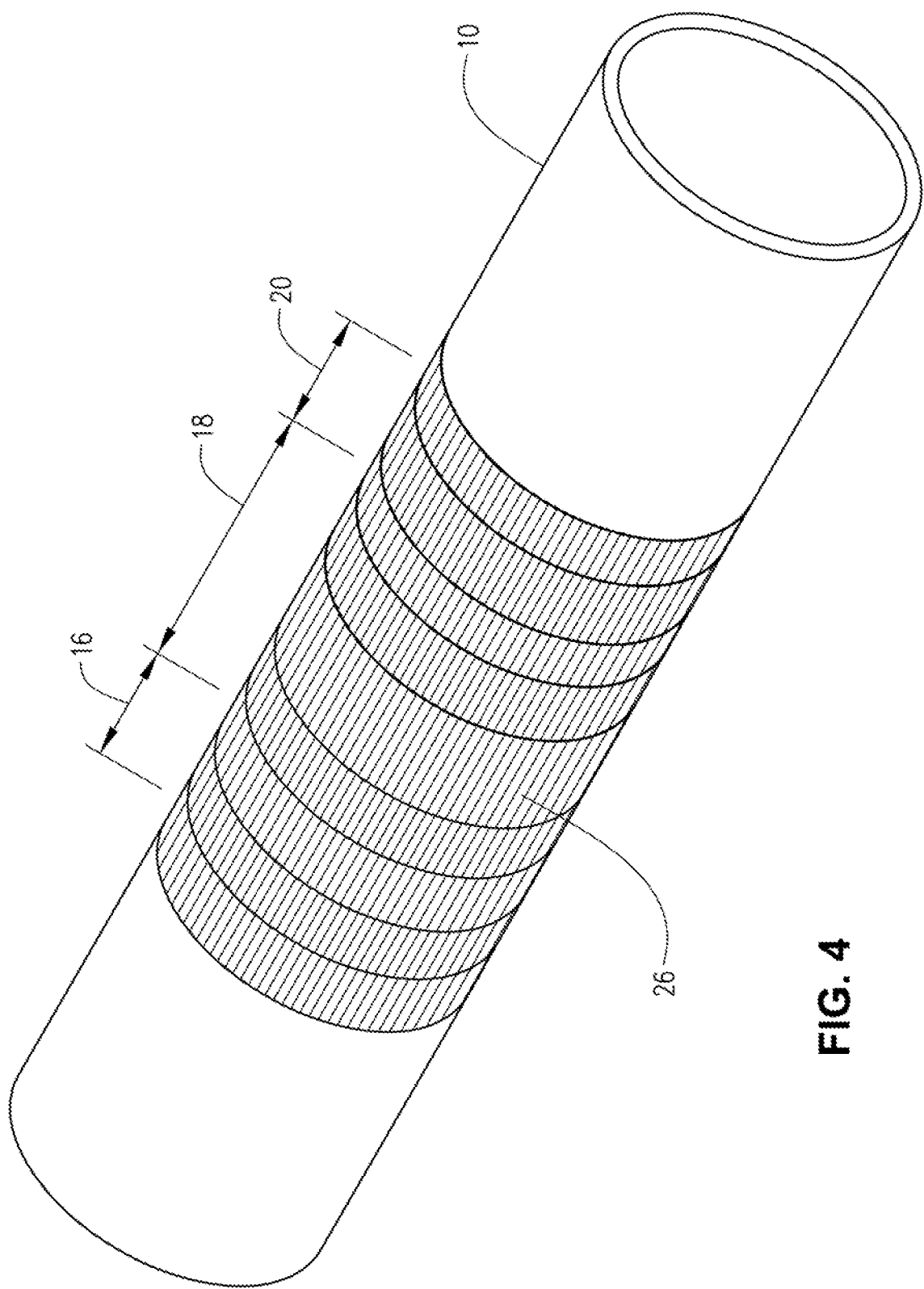
FIG. 4 is a perspective view of the pipe of FIG. 3 illustrating the completed application of the unidirectional fabric.

As illustrated in FIGS. 3 and 4, a unidirectional fabric 28 is placed on top of load transfer material 26 and resin, if applied. Unidirectional fabric 28 is circumferentially wrapped around repair area 14 of the pipe so as to result in multiple layers of the unidirectional fabric around repair area 14.

The unidirectional fabric used in the current disclosure is one with high-performance fibers, which are oriented in a direction so that the high-performance fibers will be aligned in the axial direction when the fabric is applied to the pipe. Generally, the unidirectional fabric is one specifically woven to provide all or most of the yarn in the weft direction.

Figure 7:
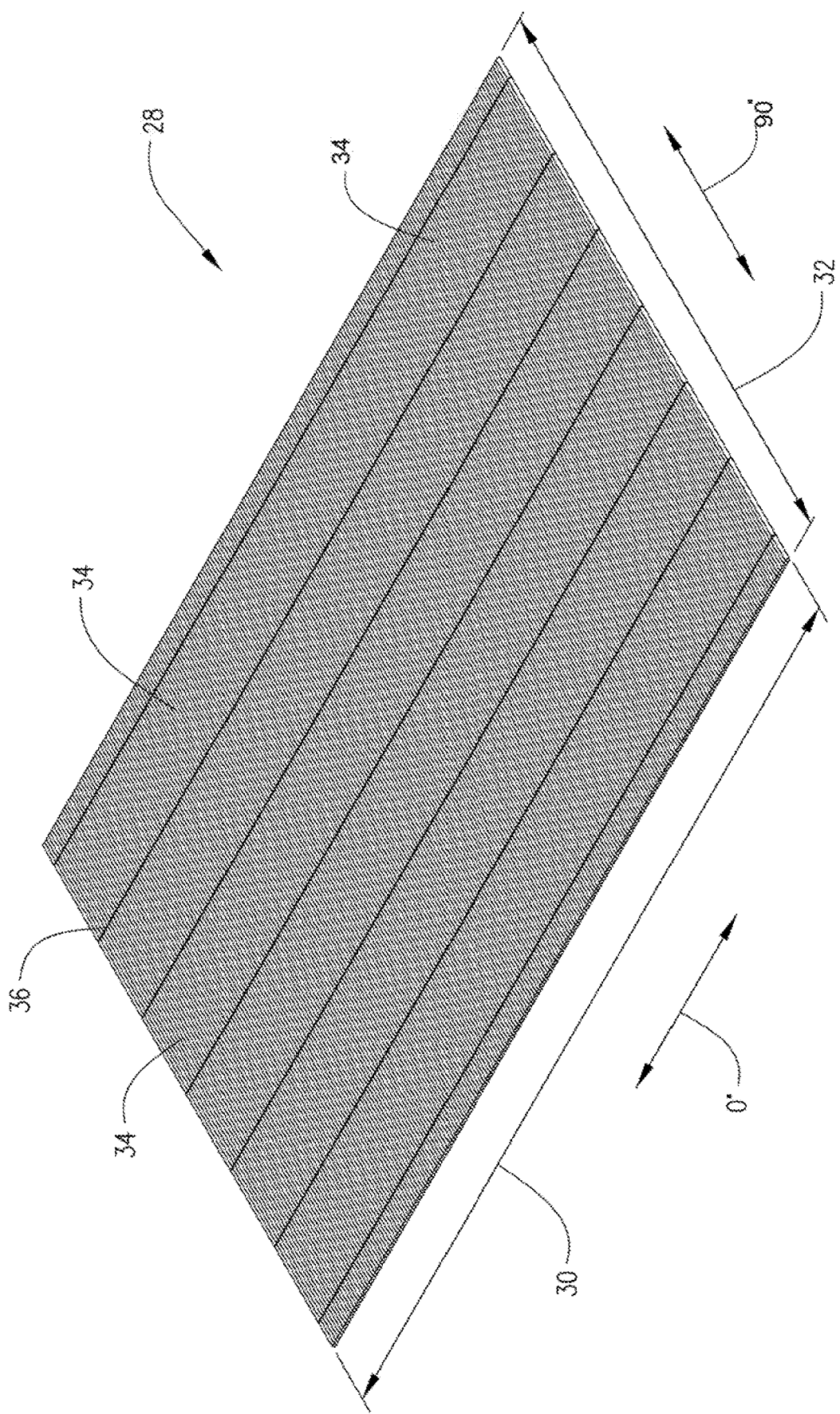
FIG. 7 is an illustration of a unidirectional fabric for use in the reinforcement of a pipe in accordance with this disclosure.

Referring to FIG. 7, unidirectional fabric 28 has a length 30 and width 32, with length 30 typically being greater than width 32. Often, width 32 will be less than the pipe circumference, and length 30 will be greater than the pipe circumference and even greater than two pipe circumferences. The length corresponds to the 0° direction for the fabric and the width corresponds to the 90° direction of the fabric. Unidirectional fabric 28 will have substantially all of its high-performance fibers 34 oriented in the 90° direction. Generally, this will mean that at least 90% of high-performance fibers 34 are oriented in the 90° direction. Typically, at least 95% or at least 98% of high-performance fibers 34 are oriented in the 90° direction. More typically, at least 99%, at least 99.5%, at least 99.9% or 100% of high-performance fibers 34 are oriented in the 90° direction.

In one embodiment, the unidirectional fabric is made of high-performance fibers 34 oriented in the 90° direction and conventional fibers 36 oriented in the 0° direction. Conventional fibers 36 are stitched to high-performance fibers 34 to thus hold them in the 90° direction. Generally, in such embodiments the conventional fibers 36 are present in only the amount necessary to ensure that the high-performance fibers 34 remain oriented in the 90° direction. Thus, the conventional fibers typically make up less than 2%, less than 1%, less than 0.5% or less than 0.1% of the total fibers (conventional fibers plus high-performance fibers) present in the fabric.

Generally, high-performance fibers are those that are engineered for specific uses that require exceptional strength, stiffness, heat resistance, or chemical resistance. These fibers have generally higher tenacity and higher modulus than typical fibers. As used herein, high-performance fibers having a Young's modulus of at least 50 GPa and a tensile strength of at least 1100 MPa based on a fiber diameter of from 8 μm to 20 μm at ambient temperature and pressure. Typically, the high-performance fibers used herein have a Young's modulus of at least 100 GPa and a tensile strength of at least 1300 MPa based on a fiber diameter of from 8 μm to 20 μm. More typically, the Young's modulus will be at least 150 GPa or at least 200 GPa, and the tensile strength will be at least 1500 MPa or at least 2000 MPa for a fiber diameter of from 8 μm to 20 μm. Non-limiting examples of high-performance fibers useful in the unidirectional fabric include carbon fibers (both pan and pitch based), glass fibers, ceramic fibers, basalt fibers and metal fibers. Currently, carbon fibers and glass fibers are preferred. Typically, the high-performance fibers will be carbon fibers or glass fibers.

On the other hand, conventional fibers, as used herein, are fibers having a Young's modulus of less than 50 GPa and a tensile strength of less than 1100 MPa based on a fiber diameter of from 8 μm to 20 μm at ambient temperature and pressure. More typically, the Young's modulus will be less than 40 GPa or less than 30 GPa, and the tensile strength will be less than 1000 MPa or less than 900 MPa for a fiber diameter of from 8 μm to 20 μm. Non-limiting examples of conventional fibers include cotton fibers, rayon fibers, polyester fibers and wool.

As illustrated in FIG. 3, the unidirectional fabric is wrapped around pipe 10 such that the 90° direction of the fabric runs parallel to axial direction 22 of pipe 10. Accordingly, when the unidirectional fabric is applied to pipe 10, the high-performance fibers run in the axial direction.

Generally, the unidirectional fabric will be applied in strips 38 (shown as 38a and 38b) of a length sufficient to wrap at least once around the circumference of repair area 14 of pipe 10. Typically, strips 38 will be of a length sufficient to wrap at least twice around the circumference of repair area 14 of pipe 10. In most applications, the length of a strip 38 will only be sufficient to provide two layers of unidirectional fabric around pipe 10. Accordingly, multiple strips are used to wrap the repair areas. In one embodiment, every other strip of the unidirectional fabric is offset from the preceding layer by from 40% to 60% of the width of the unidirectional fabric, and typically, about 50% of the width of the unidirectional fabric. For example, a first strip 38a can be wrapped to form two layers in center section 18 of repair area 14 over wrinkle bend 12. Next, a second strip 38b can be wrapped to overlap about 50% of the width of first strip 38a. With a portion of second strip 38b extending to the right of first strip 38a. Additional overlapping strips can be wrapped extending farther right until the right edge 40 of right section 20 is reached. Similarly, strips of unidirectional fabric can be wrapped overlapping first strip 38b to the left until the left edge 42 of left section 16 is reached. As will be realized, this will result in center section 18 having four layers of unidirectional fabric (two layers per each strip); however, at right edge 40 and left edge 42 there will be only two layers of unidirectional fabric. Generally, multiple wraps at each section will be performed so as to build up several unidirectional layers in center section 18, typically 10 or more, 12 or more or 20 or more layers. The numbers of layers can be reduced towards the edges so that the number of layers at the edges is less than the number of layers at center section 18. In some applications, the number of layers at right edge 40 and left edge 42 will be half or less than half the layers at center section 18 and can be a third or less of the number of layers.

In many embodiments, the unidirectional fabric will be applied wet with resin. That is, the unidirectional fabric will be coated with an uncured resin prior to application of the unidirectional fabric to pipe 10. Generally, the uncured resin will be applied on site just before application of the unidirectional fabric to pipe 10. In such embodiments, the resins initially can be in an uncured or partially cured state prior to the unidirectional fabric being applied to the pipe for reinforcement. Then the resin can be configured to cure subsequently into a rigid or semi-rigid state after the unidirectional fabric has been applied to the pipe, more typically, after the bidirectional fabric has been applied, as described below. In this manner, the unidirectional fabric layers are non-mechanically connected using the resinous material that adheres the unidirectional fabric layers to each other.

Some non-limiting examples of resins used to adhere adjacent unidirectional fibers and to adhere overlying unidirectional fiber layers include polyurethane, polyurea, epoxy, polyimide, polyoxazolidones, silanes, vinyl ester resins, and/or any one, two, or multicomponent resin systems. In some aspects, the resins include a polyurethane material having an aliphatic prepolymer. In some aspects, the resins can include a polyurethane material having an aliphatic isocyanate prepolymer. In some aspects, the resins can include a polyurethane material having an isocyanate prepolymer. In some aspects, the resins (e.g., one with an aliphatic isocyante prepolymer) include a polyurethane material chemically configured to activate and harden after removal from a generally inert environment and exposure to humid air, moisture-borne air, or an environment that otherwise provided moisture to activate the resin. In some embodiments, the resins include a two-part bisphenol epoxy resin material having a modified aliphatic amine hardener. The resins can also include a two-part novolac epoxy resin material having a modified aliphatic amine hardener.

Figure 5:
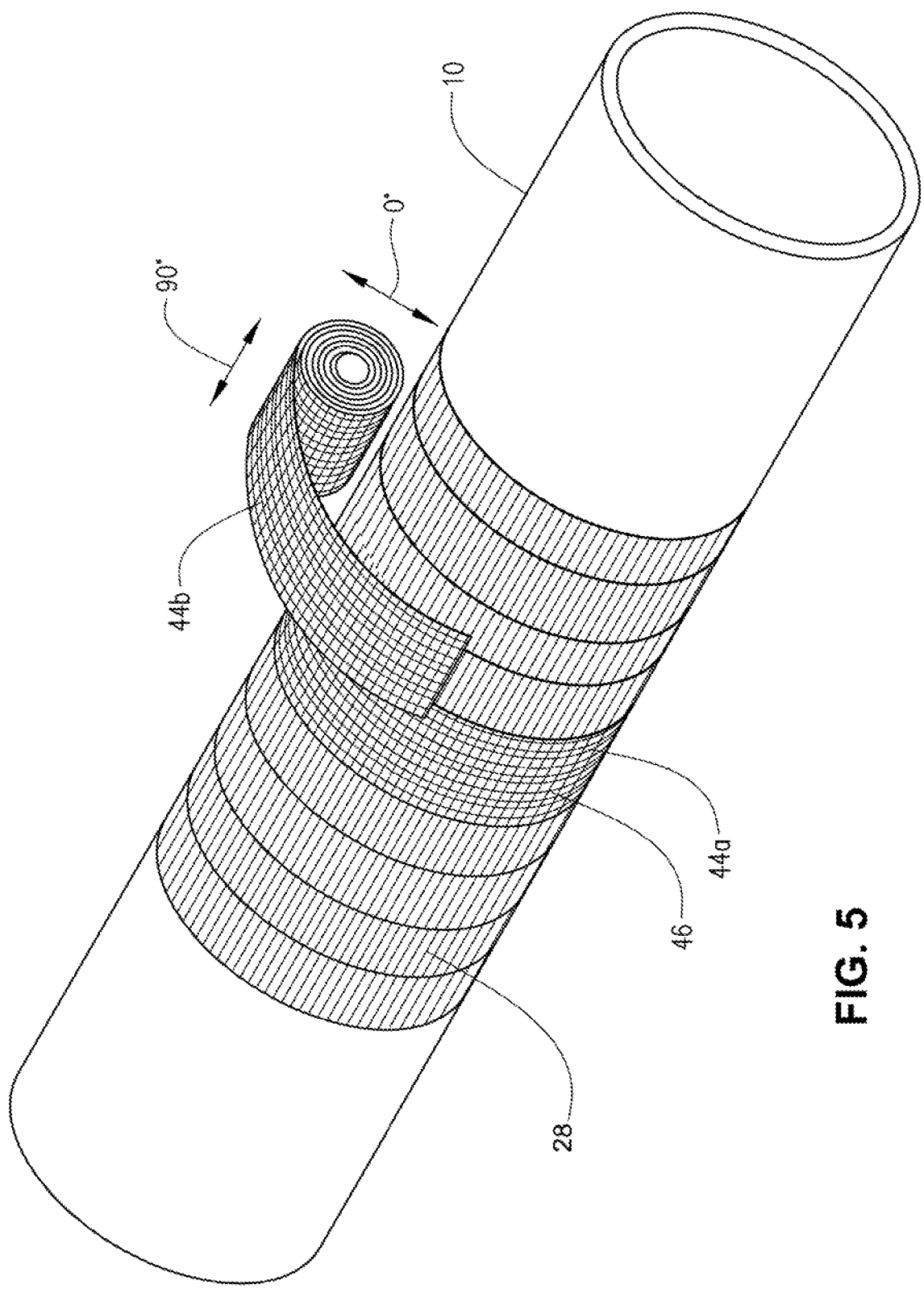
FIG. 5 is a perspective view of the pipe of FIG. 4 illustrating the application of a bidirectional fabric to the repair area.
Figure 6:
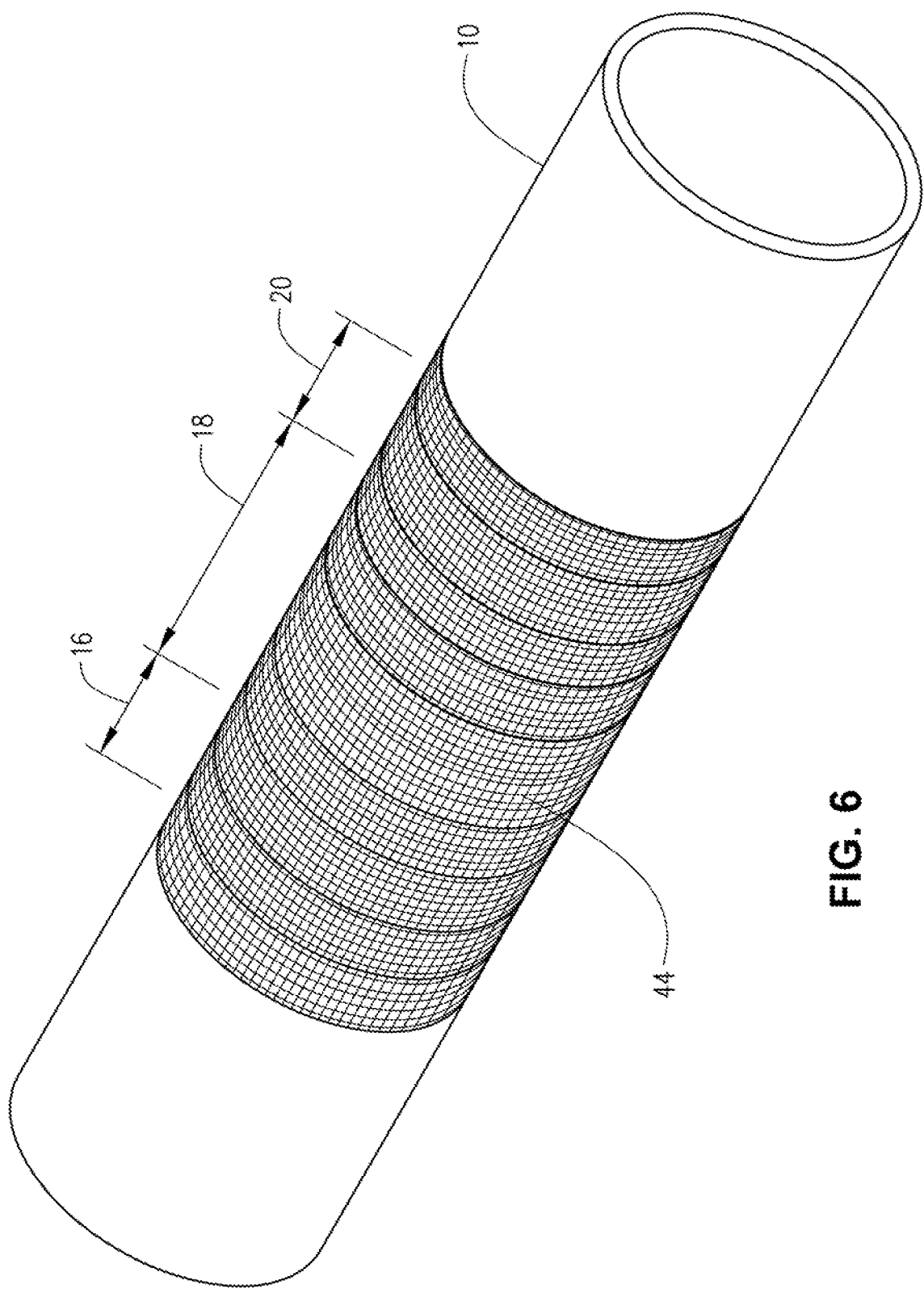
FIG. 6 is a perspective view of the pipe of FIG. 5 illustrating the completed application of the bidirectional fabric.

Turning now to FIGS. 5 and 6, a bidirectional fabric 44 is placed on top of unidirectional fabric 28. Bidirectional fabric 44 is circumferentially wrapped around repair area 14 of the pipe so as to result in multiple layers of the bidirectional fabric around repair area 14.

The bidirectional fabric used in the current disclosure is one with high-performance fibers, which are oriented in a direction so that a portion of the high-performance fibers will be aligned in the axial direction and a portion of the high-performance fibers will be aligned in the circumferential direction when the fabric is applied to the pipe. Accordingly, the bidirectional fabric 44 will have a portion of its high-performance fibers 46 oriented in the 90° direction (width) and a portion oriented in the 0° direction (length). Generally, the bidirectional fabric has from 35% to 75% of its fiber running in the 0° direction of the bidirectional fabric and 35% to 75% of its fiber running in the 90° direction of the bidirectional fabric. Typically, about 50% of the fibers will run in the 0° direction and about 50% of the fibers will run in the 90° direction. The bidirectional fabric can be a woven fabric.

Generally, the bidirectional fabric 44 can be applied in strips (e.g., 44a, 44b) similar to the description above for the unidirectional fabric. Typically, the bidirectional fabric 44 will be applied wet with resin as described for the unidirectional fabric 28.

Multiple layers of the bidirectional fabric 44 can be applied to the repair area 14. The layers of unidirectional fabric 28 and layers of bidirectional fabric 44 make up the total layers of fabric around the repair area 14. Generally, the unidirectional fabric 28 makes up at least 70% of the total layers of fabric at the center section 18. Typically, the unidirectional fabric 28 makes up at least 60% of the total layers of fabric at the left edge section 16 and makes up at least 60% of the total layers of fabric at the right edge section 20, and the bidirectional fabric 44 makes up at least 20% of the total layers of fabric at the left edge section 16 and makes up at least 20% of the total layers of fabric at the right edge section 20. In some embodiments, the unidirectional fabric 28 makes up at least 75% of the total layers of fabric at the center section 18, the unidirectional fabric 28 makes up at least 65% of the total layers of fabric at the left edge section 16 and makes up at least 65% of the total layers of fabric at the right edge section 20, and the bidirectional fabric 44 makes up at least 30% of the total layers of fabric at the left edge section 16 and makes up at least 30% of the total layers of fabric at the right edge section 20. Additionally, the unidirectional fabric 28 can make up at least 80% of the total layers of fabric at the center section 18.

In most embodiments, at the repair area 14, the reinforced pipe comprises the bidirectional fabric 44 wrapped directly onto the unidirectional fabric 28 without any other fabric or fiber material in-between the unidirectional fabric 28 and the bidirectional fabric 44. Additionally, in these embodiments the unidirectional fabric 28 is wrapped directly onto the pipe 10, which includes being wrapped directly onto the load transfer material 26 and/or resin where those are used. In other words, the unidirectional fabric 28 is wrapped onto the pipe 10 without any other fabric or fiber material in-between the pipe 10 and the unidirectional fabric 28. In some embodiments, the repair area 14 consists essentially of resin-impregnated bidirectional fabric 44 wrapped on the resin-impregnated unidirectional fabric 28, which is wrapped over the filler material 24, resin (if used) and pipe 10.

The above-reinforced pipe 10 can be produced by a method wherein the surface of the repair area 14 is prepared to receive the reinforcing fabrics, i.e., the unidirectional and bidirectional fabrics 28, 44. For example, the load transfer material 26 is first applied on a repair area 14 of the pipe 10 around the wrinkle bend 12 so as to provide a smooth transition across the repair area 14 and to cover any dents, cracks, or similar defects in the pipe 10. Typically, the load transfer material 26 is not allowed to cure before further layers are added to the repair area 14.

Also, the resin can be coated onto the repair area 14. Generally, the resin is coated onto the uncured load transfer material 26, if used. The resin is typically applied in an uncured state and generally will be allowed to cure after application of the unidirectional fabric 28 and, in some cases, after application of the unidirectional fabric 28 and the bidirectional fabric 44.

After the surface of the pipe 10 in the repair area 14 has been prepared, multiple layers of the unidirectional fabric 28 can be wrapped circumferentially around the repair area 14. As indicated above, the unidirectional fabric 28 is wrapped such that the high-performance fibers 34 run in the axial direction 22. For sufficient coverage and secure application, each strip 38 of unidirectional fabric 28 used should be at least equal to the circumference of the pipe 10 in length (0° direction). More typically, the fabric length will be greater than or equal to a least twice the circumference of the pipe 10.

After the unidirectional fabric 28 has been wrapped to completely cover the repair area 14—typically with multiple fabric layers—the bidirectional fabric 44 is wrapped over the unidirectional fabric 28 such that the layers of unidirectional fabric 28 are covered by the bidirectional fabric 44. Generally, the bidirectional fabric 44 will entirely cover the unidirectional fabric 28 and will be applied in strips (e.g., 44a, 44b) with each strip of bidirectional fabric 44 at least equal to the circumference of the pipe 10 in length (0° direction). More typically, the bidirectional fabric length will be greater than or equal to a least twice the circumference of the pipe 10. Generally, there will be multiple layers of bidirectional fabric 44 over the repair area 14, as described above. In presently preferred embodiments, the layers of bidirectional fabric 44 and unidirectional fabric 28 are not intermixed. That is, there is no alternating of the layers of bidirectional fabric and unidirectional fabric; rather, all the unidirectional fabric layers are applied first and then the bidirectional fabric layers are applied.

Typically, the method will comprise applying the resin to each unidirectional fabric strip 38a, 38b and each bidirectional fabric strip 44a, 44b prior to wrapping the unidirectional fabric 28 or bidirectional fabric 44 around the pipe 10 so that each fabric strip is wrapped around the pipe 10 with the resin in an uncured state or "resin wet" state.

EXAMPLES

The structures and techniques described above are further illustrated by the following examples, which are given by way of example only and should not be taken as limiting of the present disclosure in any way.

Finite Element Analysis

Prophetic examples were calculated wherein pipe performance was determined using finite element analysis (FEA). Performance is simulated for the following four scenarios.

Control I: A pipe free of all defects.

Control II: An unreinforced pipe having a wrinkle bend; that is, a pipe utilizing no repair of the wrinkle bend defect.

Control III: A pipe having a wrinkle bend which is reinforced in a conventional manner. A total composite thickness of 0.35-inches (8.9 mm) is simulated with all the fiber oriented in the 0° fabric direction and axially on the pipe.

Example I: A pipe having a wrinkle bend which is reinforced in a manner in accordance with this disclosure. The current composite repair design discussed herein allows all pieces of fabric to be installed in the hoop direction of the pipe (circumferentially instead of axially), eliminating axial strips. A total composite thickness of 0.43-inches (10.9 mm) is simulated with 0.34-inches being unidirectional fiber oriented in the 90° fabric direction and 0.09-inches being bidirectional fiber wrapped over the unidirectional fiber.

Difference in composite thickness from Control III and Example I represent difference in design which resulted in different minimum thickness need to ensure ease of installation while still providing pipe reinforcement.

An FEA is used to analyze the above scenarios. The FEA model is built based on the wrinkle bend geometry used in an experimental study on actual pipes. The pipe specifications for all the Examples herein match that of the prior study, which were 26-inch (650 mm) diameter by 0.281-inch (7.14 mm) nominal wall thickness, Grade X52 carbon steel. The wrinkle height (bulge above standard pipe surface) in the FEA simulation is 0.5-inches (12.7 mm) and the wrinkle length (extension circumferentially along the pipe) is 5 inches (127 mm). The FEA analysis simulates the pipe being pressurized internally to 810 psi (5.58 MPa), and then applying a bending moment range of +600 kip-ft (+82,953 kgf-m) to −400 kip-ft (−55,302 kgf-m) to the wrinkled pipe.

The FEA is performed on all four scenarios in two stages: an elastic simulation to determine a theoretical stress concentration factor (SCF) and an elastic-plastic simulation to determine the strain range on the wrinkle of each scenario with respect to the bending moment range. The development of the stress-strain response allows the prediction of the cyclic bending fatigue life of the two repair scenarios (Control III and Example I).

Elastic FEA Simulations

Elastic FEA is performed on the four scenarios noted above, with an internal pressure of 810 psi (5.58 MPa) and a bending moment range of 1,000 kip-ft (138,255 kgf-m). Table 1 shows the theoretical SCFs calculated using elastic FEA for Control II, Control III and Example I. Additionally, Table I shows the SCF that was calculated for a conventional wrinkle pipe repair as described for Control III but using gathered strain gage data from a prior study (Control IV). The prior study was not a simulated study. The prior study utilized a 0.35-inches (8.9 mm) composite thickness, and failed after 749 bending cycles. The initial measured axial strain range at the wrinkle during the cycling was 4,997 με and the calculated stress concentration factor (SCF) was 2.4.

TABLE 1

| Elastic FEA Results | |
|---|---|
| Scenario | SCF |
| Control II | 4.3 |
| Control III | 2.8 |

TABLE 1-continued

| Elastic FEA Results | |
|---|---|
| Scenario | SCF |
| Control IV | 2.4 |
| Example I | 1.5 |

As seen in the elastic FEA results, the current design (Example I) lowers the theoretical stress concentration factor significantly and even more so when compared to the unreinforced pipe with the wrinkle. Additionally, this analysis shows that the effective SCF measured using strain gages during the experimental study (Control IV) is close to the FEA-determined SCF. Therefore, the proximity of the results demonstrate that the FEA results were within the range of viability, and could be trusted to translate to increased performance on the full-scale testing or actual use.

Elastic-Plastic FEA Simulations

Figure 8:
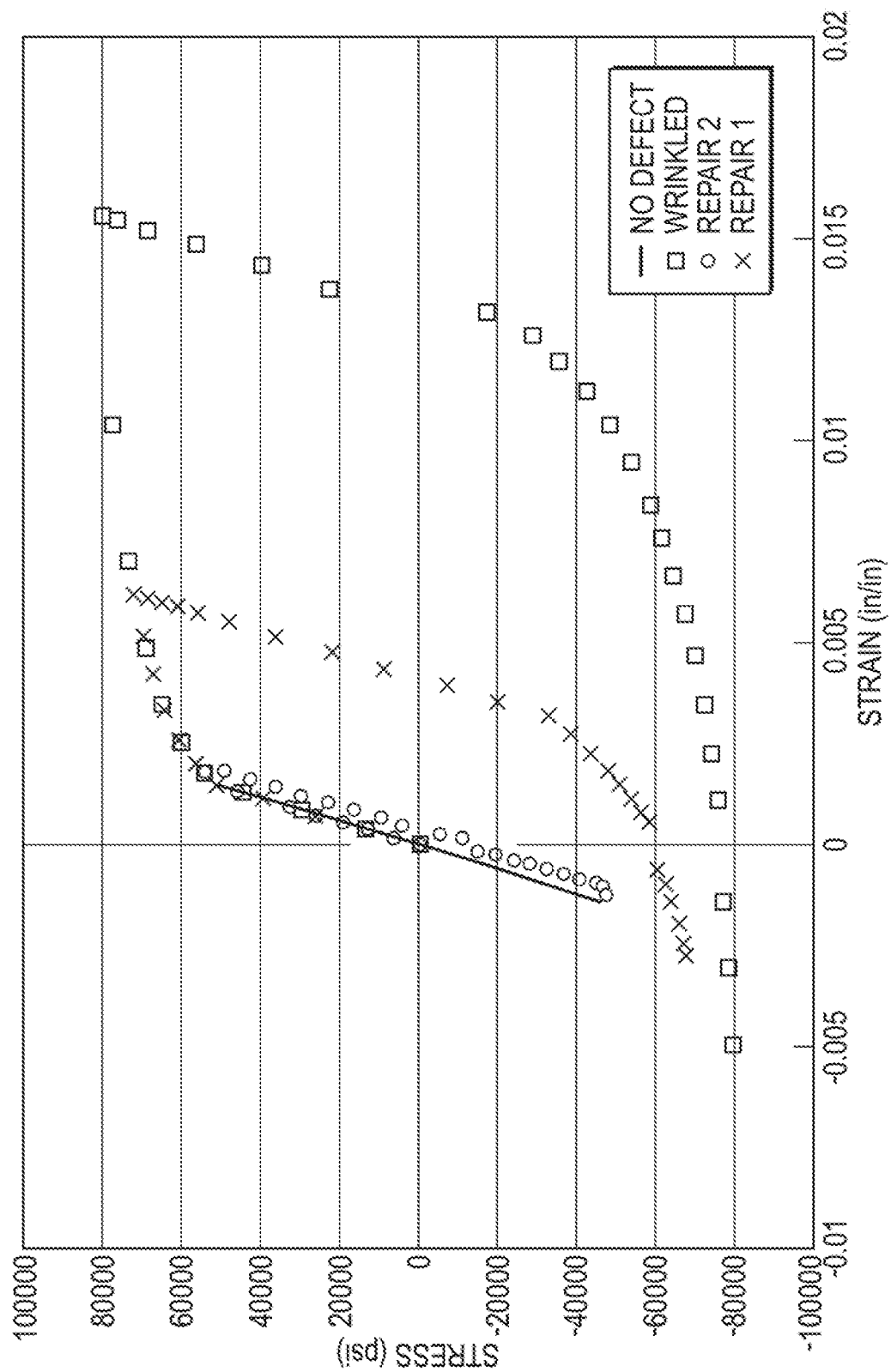
FIG. 8 is a graph of stress v. strain that illustrates the stress and strain ranges for a typical bending cycle for Control I, Control II, Control III and Example I.

The elastic-plastic simulations on each of the four scenarios are calculated to show the range of elastic and plastic deformation in the pipe and wrinkle under the varying repair methods. The elastic-plastic simulations again use an internal pressure of 810 psi and a bending moment range of 1,000 kip-ft. Due to the high strain and plastic deformation at the wrinkle section, low pressure cycle fatigue occurs and leads to failure at the wrinkle location when unrepaired. When repaired, the strain is reduced at the wrinkle, and therefore the fatigue life is extended. FIG. 8 shows the stress and strain ranges for a typical bending cycle for each of the four scenarios.

As seen in FIG. 8, both the stress and strain show the highest range on the unrepaired wrinkled pipe (Control II). Control III ("Repair 1") has a slightly reduced stress range compared to Control II, while significantly reducing the strain range. Meanwhile, Example I ("Repair II") demonstrates a reduced stress and strain range over both Control II and Control III, and therefore should shows an increase in bending fatigue cycles. Example I most closely matches the stress and strange range for a pipe with no defect (Control I).

The analysis shows the Example I design decreases the maximum strain at the wrinkle by 69% in tension and 50% in compression when compared to Control III. Upon examination, the highest strains are found on the inside surface of the wrinkle.

The stress and strain range response presented in FIG. 8 for Control II also correlated closely with the actual strain gage data collected by SES during the prior study. Once again, the results of the FEA analysis are demonstrated to be accurate, and therefore it is predicted that the optimized composite repair design will show increased bending fatigue resistance.

Sample Pipe Testing

Full-scale testing (non-prophetic) was performed on state-of-the-art equipment that can subject the required bending moments and internal pressures to a wrinkled 26-inch (650 mm) diameter pipe test samples. Strain gages were placed at strategic locations on and around the wrinkle to collect important information to evaluate strains, especially those measured on the reinforced samples that were used to quantify the performance of each design.

Control V

To determine controlled baseline data, an unreinforced wrinkle was subjected to the constant internal pressure of 810 psi and an 800 kip-ft range of bending moments.

Internal pressure was introduced and the specimen was subjected to cycling between the minimum and maximum bending moments until failure resulted in the form of a leak. The control specimen failed within 165 bending cycles, due to a through-wall circumferentially-oriented crack that had developed at the wrinkle.

Based on the results of the unrepaired wrinkle, a 1000 kip-ft bending moment range was chosen for the reinforced test specimens.

Examples

A first embodiment of the current design was installed on a wrinkled pipe as described for Example I. For Example II, the repair was installed exactly as per Example I in the FEA analysis, providing a 5-foot (1.5 m) composite repair length with a thickness of 0.43-inches (10.9 mm).

A second embodiment was installed on wrinkled pipe. For Example III, the repair was installed similarly to Example II with a composite repair length of 5-feet (1.5 m), but increased the total composite repair thickness to 0.65-inches (16.5 mm). Layup configurations for Example II and Example III are shown in Table 2.

TABLE 2

Example II and Example III: Composite Reinforcement Layup Configurations

| Example II (0.43-inch Composite Thickness) | Example III (0.65-inch Composite Thickness) |
|---|---|
| 0.34-inches of proprietary fiberglass over the wrinkle and extending to a 5-foot repair length | 0.56-inches of proprietary fiberglass over the wrinkle and extending to a 5-foot repair length |
| 0.09-inches of bi-directional carbon fiber over the 5-foot repair length | 0.09-inches of bi-directional carbon fiber over the 5-foot repair length |

Example II was pressurized to 810 psi and then subjected to the 1,000 kip-ft bending moment range. Example II was subjected to 1,340 bending cycles prior to composite failure. This represented an almost 600 bending cycle increase compared to that determined for Control IV from the prior study. Additionally, the average axial strain range at the wrinkle was decreased from 4997 με for Control IV to approximately 4000 με for Example II. The calculated SCF from the test was 1.8.

Example III was pressurized and then subjected to the 1,000 kip-ft bending moment range similar to the previous reinforced specimens. Example III finally failed at 2,068 bending cycles, a significant increase compared to all previous iterations of the full-scale experiments. The axial strain range at the wrinkle also showed improvement, decreasing to 3000 με and leading to a calculated SCF of 1.2. This axial strain measurement and the resulting SCF were the lowest of all of the manufacturer's tested designs, demonstrating significant improvement compared to Control IV and Example II. The results are summarized in Table 3.

TABLE 3

| | Control IV (prior study) | Example II | Example III |
|---|---|---|---|
| Bends Cycles to Failure | 749 | 1,340 | 2,068 |
| Axial Strain Range | 4,997με | 4000με | 3000με |
| SCF | 2.4 | 1.8 | 1.2 |

Overall, the FEA analysis closely mirrored the testing results that were gathered on full-scale pipe specimens. From both the FEA and full-scale testing results, it can be seen that the current reinforcing system is an effective strategy for enhancing the fatigue resistance of the wrinkled pipes subjected to cyclic bending moments and constant internal pressure, as found in natural gas pipelines having wrinkle bends. Specifically, Example III decreased the axial strain at the wrinkle by 40%.

The above Examples demonstrate, through FEA and full-scale testing, that the current system reduces the axial strain at the wrinkle, therefore leading to an increased fatigue life. This increase in fatigue life can be achieved by using the new fabric orientation of the current embodiments that allow for reduction in installation error while increasing the speed and reliability of each installation. The optimized composite repair system provides a safe repair alternative to large enclosures or cut out and replacement. As a result, this current composite repair system will save pipeline operators time and money by allowing for reduced material costs, installation times, and increased reliability.

The above elements of the reinforced pipe and method as well as others can be seen with reference to the figures. From the above description and figures, it will be seen that the present invention is well adapted to carry out the ends and advantages mentioned, as well as those inherent therein. While the presently preferred embodiment of the apparatus has been shown for the purposes of this disclosure, those skilled in the art may make numerous changes in the arrangement and construction of parts. All of such changes are encompassed within the scope and spirit of the appended claims.

What is claimed is:

1. A reinforced pipe having an axial direction and a circumferential direction with a wrinkle bend oriented in the circumferential direction, the pipe comprising:
    a repair area having a left section, a right section and a center section such that the center section is between the left section and the right section, and the center section contains the wrinkle bend;
    a unidirectional fabric circumferentially wrapped around the repair area of the pipe so as to result in multiple layers of the unidirectional fabric around the repair area; wherein the unidirectional fabric has a length, a width, a 0° direction corresponding to the length and a 90° direction corresponding to the width, and wherein the unidirectional fabric is composed of high-performance fibers with at least 90% of the high-performance fibers oriented in the 90° direction, and wherein the unidirectional fabric is wrapped such that the high-performance fibers run in the axial direction; and
    a bidirectional fabric wrapped over the unidirectional fabric such that the at least one layer of bidirectional fabric is wrapped over the unidirectional fabric, and the layers of unidirectional fabric and layers of bidirectional fabric make up the total layers of fabric around the repair areas, and wherein the unidirectional fabric makes up at least 70% of the total layers of fabric at the center section.

2. The reinforced pipe of claim 1, wherein the unidirectional fabric and bidirectional fabric are wrapped wet with resin.

3. The reinforced pipe of claim 1, wherein the unidirectional fabric makes up at least 60% of the total layers of fabric at the left edge section and makes up at least 60% of the total layers of fabric at the right edge section, and wherein the bidirectional fabric makes up at least 20% of the total layers of fabric at the left edge section and makes up at least 20% of the total layers of fabric at the right edge section.

4. The reinforced pipe of claim 3, wherein the unidirectional fabric makes up at least 75% of the total layers of fabric at the center section, wherein the unidirectional fabric makes up at least 65% of the total layers of fabric at the left edge section and makes up at least 65% of the total layers of fabric at the right edge section, and wherein the bidirectional fabric makes up at least 30% of the total layers of fabric at the left edge section and makes up at least 30% of the total layers of fabric at the right edge section.

5. The reinforced pipe of claim 4, wherein the unidirectional fabric makes up at least 80% of the total layers of fabric at the center section.

6. The reinforced pipe of claim 1, wherein the unidirectional fabric is wrapped around the repair area in multiple strips and each strip is of sufficient length such that each strip provides at least two layers when wrapped circumferentially around the pipe.

7. The reinforced pipe of claim 6, wherein every other strip of the unidirectional fabric is offset from the preceding layer by from 40% to 60% of the width of the unidirectional fabric.

8. The reinforced pipe of claim 1, wherein the unidirectional fabric is composed of high-performance fibers and conventional fibers with the high-performance fibers oriented in the 90° direction and the conventional fibers oriented in the 0° direction, and wherein the conventional fibers are stitched to the high-performance fibers thus holding them in the 90° direction.

9. The reinforced pipe of claim 8, wherein the high-performance fibers have a Young's modulus of at least 100 GPa and a tensile strength of at least 1300 MPa based on a fiber diameter of 8 µm to 20 µm.

10. The reinforced pipe of claim 9, wherein the conventional fibers have a Young's modulus of less than 50 GPa and a tensile strength of less than 1100 MPa based on a fiber diameter of from 8 µm to 20 µm.

11. The reinforced pipe of claim 1, wherein the bidirectional fabric has a length, a width, a 0° direction corresponding to the length of the bidirectional fabric and a 90° direction corresponding to the width of the bidirectional fabric, and wherein the bidirectional fabric has from 35% to 75% of its fiber running in the 0° direction of the bidirectional fabric and 35% to 75% of its fiber running in the 90° direction of the bidirectional fabric.

12. A method of reinforcing a steel pipe having an axial direction and a circumferential direction with a wrinkle bend oriented in the circumferential direction, the method comprising:
applying a load transfer material on a repair area of the pipe around the wrinkle bend so as to provide a smooth transition; wherein the repair area has a left section, a right section and center section such that the center section is between the left section and right section and contains the wrinkle bend;
applying a resin over the repair area;
wrapping multiple layers of a unidirectional fabric circumferentially around the repair area; wherein the unidirectional fabric has a length, a width, a 0° direction corresponding to the length and a 90° direction corresponding to the width, and wherein the unidirectional fabric is composed of high-performance fibers with 90% of the high-performance fibers oriented in the 90° direction, and wherein the unidirectional fabric is wrapped such that the high-performance fibers run in the axial direction;
wrapping at least one layer of a bidirectional fabric over the unidirectional fabric such that the layers of unidirectional fabric and layers of bidirectional fabric make up the total layers of fabric around the repair area, and wherein the unidirectional fabric makes up at least 70% of the total layers of fabric at the center section.

13. The method of claim 12, wherein the unidirectional fabric is wrapped around the repair area in multiple strips and each strip is of sufficient length such that each strip provides at least two layers when wrapped circumferentially around the pipe.

14. The method of claim 13, wherein every other strip of the unidirectional fabric is offset from the preceding layer by from 40% to 60% of the width of the unidirectional fabric.

15. The method of claim 14, further comprising applying the resin to the unidirectional fabric and bidirectional fabric prior to wrapping the unidirectional fabric or bidirectional fabric around the pipe.

16. The method of claim 15, wherein the unidirectional fabric makes up at least 60% of the total layers of fabric at the left edge section and makes up at least 60% of the total layers of fabric at the right edge section, and wherein the bidirectional fabric makes up at least 20% of the total layers of fabric at the left edge section and makes up at least 20% of the total layers of fabric at the right edge section.

17. The method of claim 16, wherein the unidirectional fabric makes up at least 75% of the total layers of fabric at the center section, wherein the unidirectional fabric makes up at least 65% of the total layers of fabric at the left edge section and makes up at least 65% of the total layers of fabric at the right edge section, and wherein the bidirectional fabric makes up at least 30% of the total layers of fabric at the left edge section and makes up at least 30% of the total layers of fabric at the right edge section.

18. The method of claim 17, wherein the unidirectional fabric makes up at least 80% of the total layers of fabric at the center section.

19. The method of claim 17, wherein the unidirectional fabric is composed of high-performance fibers and conventional fibers with the high-performance fibers oriented in the 90° direction and the conventional fibers oriented in the 0° direction, and wherein the conventional fibers are stitched to the high-performance fibers thus holding them in the 90° direction.

20. The method of claim 19, wherein the high-performance fibers have a Young's modulus of at least 100 GPa and a tensile strength of at least 1300 MPa based on a fiber diameter of 8 µm to 20 µm.

21. The method of claim 20, wherein the conventional fibers have a Young's modulus of less than 50 GPa and a tensile strength of less than 1100 MPa based on a fiber diameter of from 8 µm to 20 µm.

22. The method of claim 1, wherein the bidirectional fabric has a length, a width, a 0° direction corresponding to the length of the bidirectional fabric and a 90° direction corresponding to the width of the bidirectional fabric, and wherein the bidirectional fabric has from 35% to 75% of its fiber running in the 0° direction of the bidirectional fabric and 35% to 75% of its fiber running in the 90° direction of the bidirectional fabric.

* * * * *